United States Patent [19]

Webb

[11] Patent Number: 5,003,760
[45] Date of Patent: Apr. 2, 1991

[54] GARDEN TOOL

[76] Inventor: Nancy A. Webb, R.R. #10, Brampton, Ontario, Canada, L6V 3N2

[21] Appl. No.: 425,929

[22] Filed: Oct. 24, 1989

[51] Int. Cl.$^5$ ............................................. A01D 11/06
[52] U.S. Cl. ................................ 56/400.06; 56/400.16; 56/400.21; 172/379
[58] Field of Search ............ 56/193, 233, 239, 400.01, 56/400.04, 400.05, 400.07, 400.09, 400.14, 400.15, 400.16, 400.21, DIG. 21, 400.1, 158; 172/371, 375, 378, 379, 765

[56] References Cited

U.S. PATENT DOCUMENTS

| | | |
|---|---|---|
| D. 199,131 | 9/1964 | Taylor . |
| D. 230,247 | 2/1974 | Parry . |
| 143,578 | 10/1873 | Jones . |
| 489,058 | 1/1893 | White ................................ 172/371 |
| 850,228 | 4/1907 | Jackson ........................... 56/400.05 |
| 1,138,274 | 5/1915 | Bozarth . |
| 1,158,335 | 10/1915 | Upton ................................ 56/400.05 |
| 1,187,876 | 6/1916 | Wester . |
| 1,899,414 | 2/1933 | Gray ................................. 56/400.14 |
| 2,045,394 | 6/1936 | Kuhlman . |
| 2,225,108 | 12/1940 | Glascock ......................... 56/400.14 |
| 2,296,916 | 9/1942 | Gamburg ........................... 172/375 |
| 2,597,954 | 5/1952 | Schaller . |
| 2,726,504 | 12/1055 | Paluska . |
| 2,787,882 | 4/1957 | Huley . |
| 3,921,725 | 11/1975 | Trutor et al. .................... 172/375 |
| 4,169,509 | 10/1979 | Lowman ............................ 172/375 |
| 4,174,003 | 11/1979 | Zepeda .............................. 172/375 |
| 4,730,679 | 3/1988 | Tallerico et al. .................. 172/375 |

OTHER PUBLICATIONS

Garant Catalogue No. 39 (no date) p. 28.

Primary Examiner—Ramon S. Britts
Assistant Examiner—Terry Lee Melius
Attorney, Agent, or Firm—Ridout & Maybee

[57] ABSTRACT

A combination cultivator, rake and hoe having cultivator tines of uneven length parallel to one another and inclined with respect to the handle. A hoe blade, preferably with a sharpened forward edge is connected on one or both ends of the row of cultivator tines extending substantially parallel to the tines and to the handle. Rake tines directed oppositely to the cultivator tines are offset upwardly toward the handle. The uneven lengths of the cultivator tines reduce the intitial force needed to be applied to penetrate the soil and the blade or blades exert substantially no drag when the tines are moved forwardly or backwardly through the soil. The hoe blade or blades can be used with the tool rotated 90° from the cultivating position. The blade is pushed against the stem of weeds or other growth to be removed, slightly below the soil surface.

10 Claims, 3 Drawing Sheets

GARDEN TOOL

The present invention relates to a combination garden tool intended to be manually used.

Before this invention, it has been recognized by designers and manufacturers of garden tools that using a multitude of garden tools separately is time consuming in that various tools, usually strewn about the yard during gardening, were needed at different times for different garden cultivating chores. The gardener would be constantly picking up a variety of gardening tools and either carrying them where he or she went or retrieving them from the spot where they were last placed. This increased gardening time and was a constant irritation to the gardener.

In response to this, various combination garden cultivating tools were made to perform a variety of cultivating tasks. Previous combination garden cultivating tools, as shown in U.S. Pat. Nos. Wester 1,187,876, Schaller 2,597,954, Trutor 3,921,725 and DES. Taylor U.S. Pat. No. 199,131, do not fully take into consideration soil characteristics and motion of the tool relative to the soil and have poor handling characteristics. U.S Pat. Nos. Wester 1,187,876 and Trutor 3,921,725 show cultivators equipped with hoe blades, but these implements tend to twist in the hands of the user if used with the relatively heavy hoe blades upper most. Design Taylor U.S. Pat No. 199,131 has wing-like blade portions on each side which increase drag and preclude the cultivator tines from being drawn freely through the soil. Schaller U.S. Pat. No. 2,597,954 shows tines which are better balanced but does not provide a hoe blade. Further, known cultivators have cultivating tines terminating at a common plane which meet initial soil resistance immediately, thereby requiring a large initial force to break through the soil's surface. With previous combination cultivating tools equipped with hoe blades, in order to use the hoe blade it was necessary to turn the implement about its handle to position the hoe blade above the work and then to hack in large arc patterns, at the growth. This tended to displace the soil and submerge the excised growth thereby requiring additional cultivating time to remove the growth and return the soil to its initial position. It also expended needless amounts of the gardener's energy.

In response to these problems, the present invention's general purpose and object is to provide a combination garden cultivating tool that optimally takes into consideration soil resistance to movement of the tool.

Another object is to provide a combination garden cultivating tool that can sever surface and subsurface growth with minimum soil disturbance.

A further object is to diminish the expenditure of energy by the gardener.

The present invention provides a gardening tool having an elongated handle; and a cultivator head attached at one end of the handle and having: (a) a row of relatively long cultivator tines each tapering towards its tip and extending substantially parallel to the others and generally inclined to the axis of the handle; (b) a row of relatively short rake tines of even length each tapering towards its tip and disposed parallel to the cultivator tines, the ends of the rake tines being offset upwards in the direction of the handle from the ends of the cultivator tines and extending in a direction opposite to the cultivator tines; and (c) a generally planar blade member connected on an end of the row of cultivator tines and extending substantially parallel to the tines and substantially parallel to the handle, the blade member increasing in width downwardly from its point of connection to the cultivator head to its free end, whereby the blade member adjacent its lower end exposes blade edges spaced away from the cultivator tines in the direction longitudinally parallel to the handle.

One advantage of this arrangement is that the blade exerts little drag on the soil in the course of using the tool as a cultivator when the tines are drawn through the soil. The implement can be readily used as a hoe by turning it on its side and pushing the forward edge of the blade against the growth to be cut. Since the hoe blade is positioned below the axis of the handle in normal use, its weight does not tend to twist or overbalance the implement in the hands of the user.

In a preferred form, the cultivator tines are alternately long and then short, the tines being arranged symmetrically with respect to a median plane passing through the axis of the handle. With this arrangement, only the longer tines contact the soil initially, with the result that the soil can be penetrated and working of the soil commenced with application of a smaller downward pressure than would be required with known arrangements.

For a more complete understanding of the invention, reference may be had to the following description and accompanying drawings in which.

Figure 1:
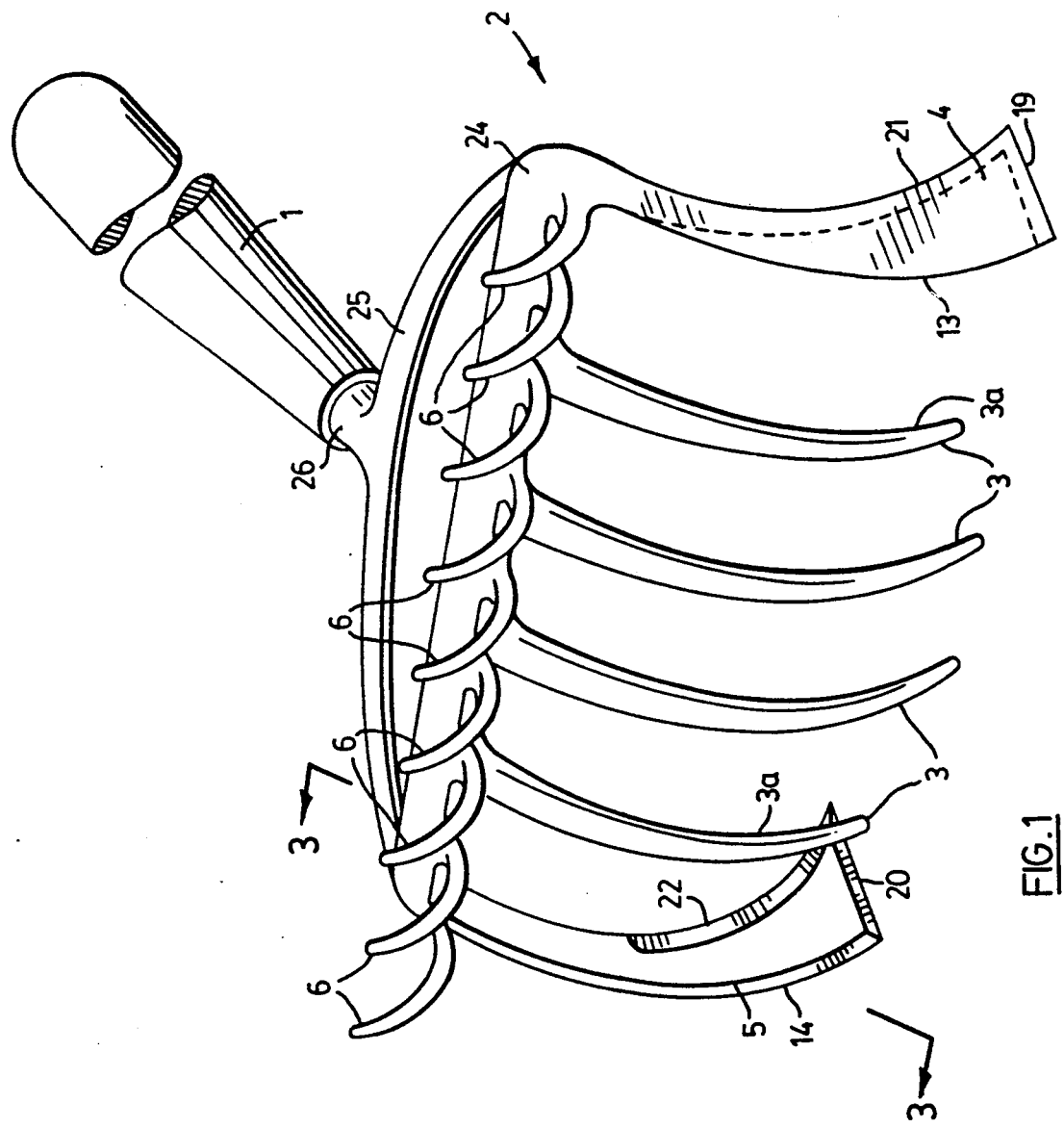
FIG. 1 is a perspective view of a preferred embodiment of the cultivating head.
Figure 2:
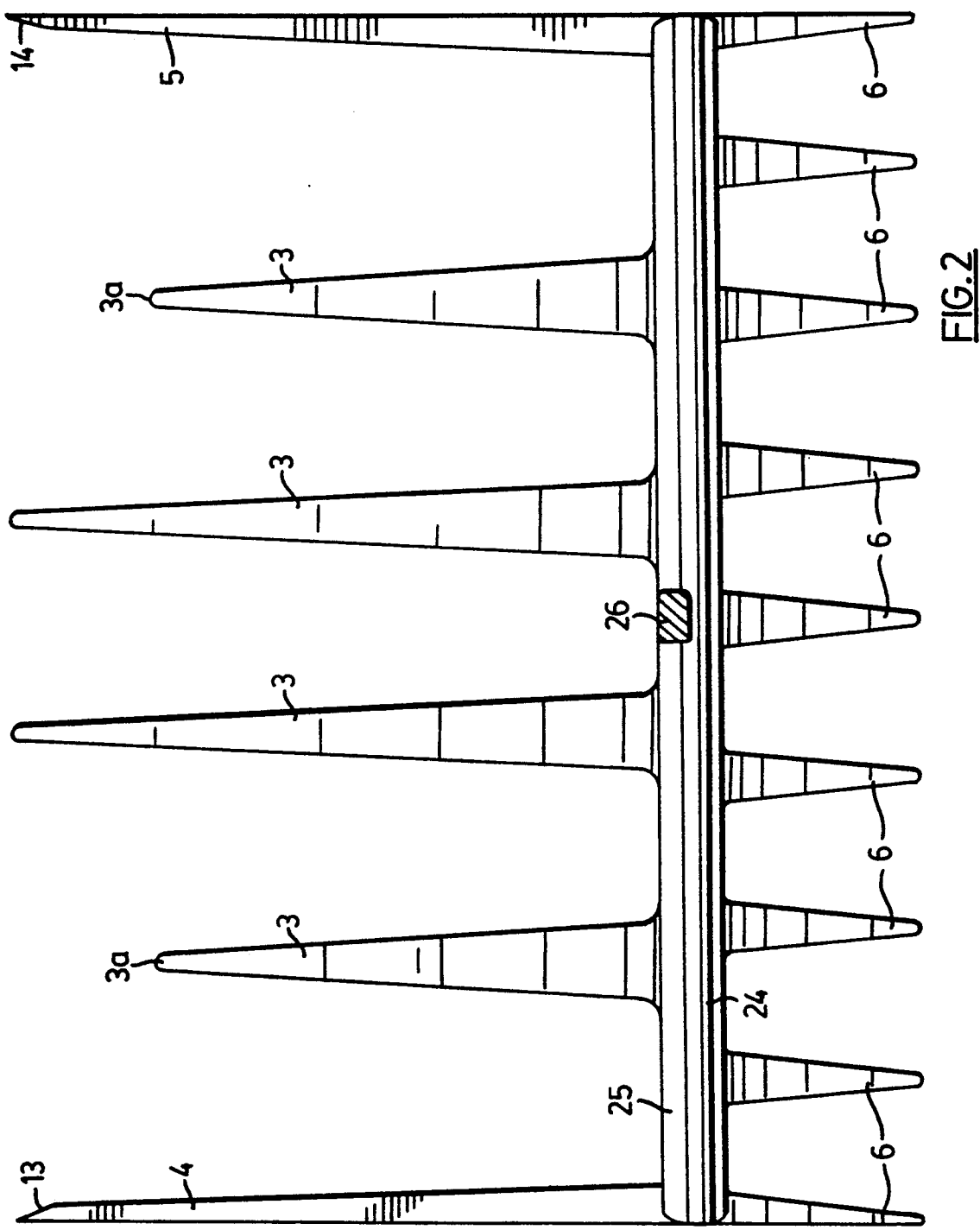
FIG. 2 is a view of the cultivating head from above, partly in cross-section on the lines 2—2 in FIG. 3.

Referring now to FIG. 1, there is shown a gardening tool having an elongated handle 1 and a cultivator head 2 attached at one end of the handle having cultivator tines 3 disposed in a row and each extending substantially parallel to the others (as seen in plan) and generally inclined to the axis of the handle 1. Two generally planar blade members 4 and 5 are connected one on each end of said row and extend substantially parallel to the tines 3 and substantially parallel to the handle 1. A row of rake tines 6 of even length shorter than the tines 3 of said cultivator row is disposed in a general plane opposite to and set upwards in the direction of the handle 1 from the tines 3 of said cultivator row, so that the cultivator tines 3 and the rake tines 6 can be used independently by rotating the handle 1 through 180°. The blade members 4 and 5, by being disposed parallel to the tines 3 and to the handle 1 reduce the drag to a minimal amount when cultivating the soil by moving the tines 3 together with the blades 4 and 5 through the soil in the direction parallel to the handle 1. In the preferred form, the blade members 4 and 5 extend rearwardly from the row of tines 3 generally towards the handle. The tool may be provided with only one of the blade members 4 and 5 but in the preferred form, as shown, two blade members 4 and 5 are connected to opposite ends of said row of tines 3 and are disposed symmetrically with respect to a median plane through the axis of the handle 1. The provision of two blade members 4 and 5 may allow persons, whether left or right handed to use of the tool with equal advantage and allows the tool to be balanced in handling and in use.

Figure 3:
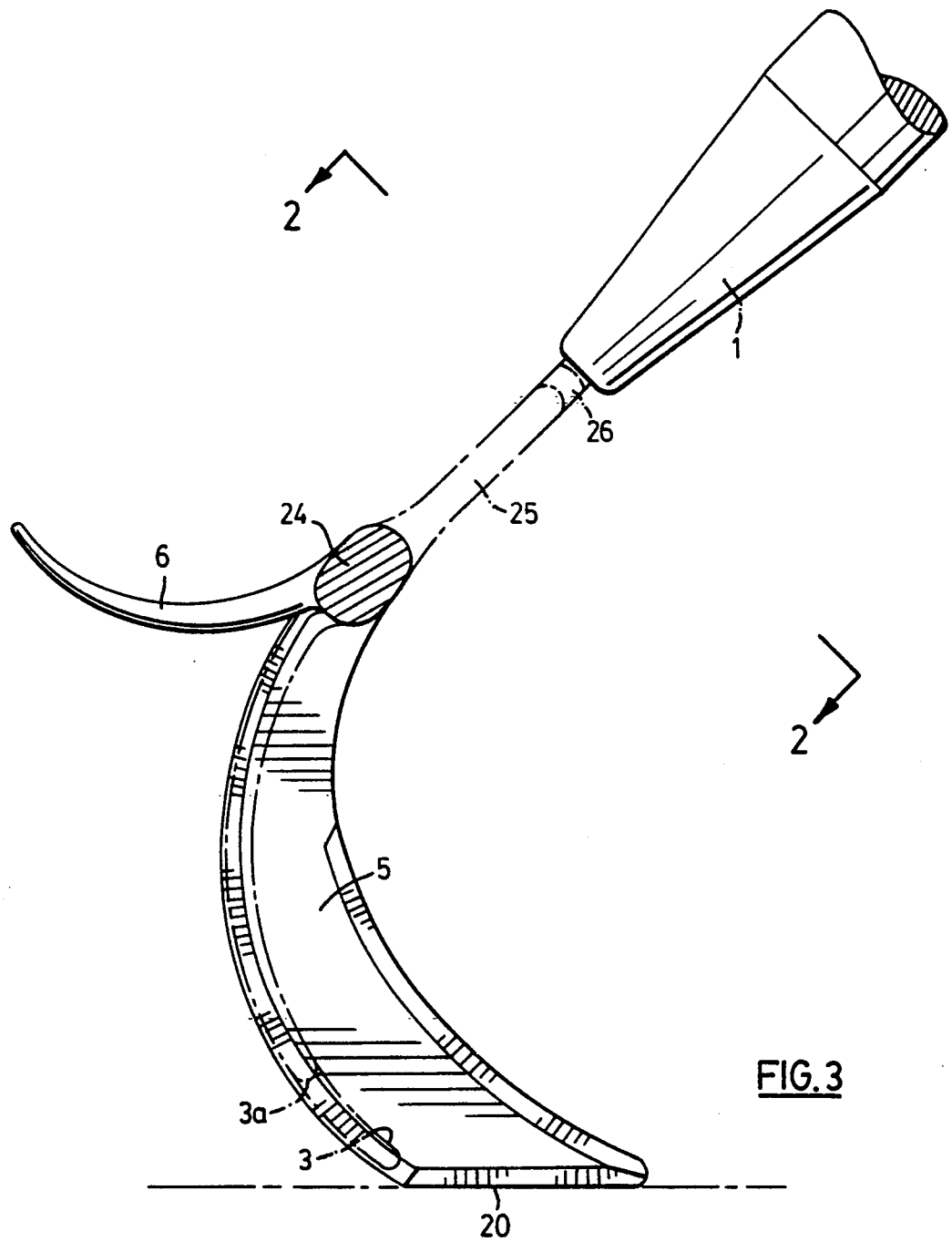
FIG. 3 is a cross-sectional view of the cultivator head on the line 3—3 in FIG. 1.

The row of tines 3 comprises two shorter tines, the tips 3a of which are shown in broken lines in FIG. 3. The tines 3 are, as with the blade members 4 and 5, disposed symmetrically about a median plane through the axis of the handle 1 so that the tool is evenly balanced and does not tend to twist in the hands of the user either when being held above the soil or when being drawn through the soil during cultivation. The tips 3a do not initially contact the soil when the tool is pressed into the soil surface and only the longer tines 3 and the blade members 4 and 5 initially contact the soil. Thus the downward force applied by the user is transmitted through a smaller area and a greater effective pressure is applied, so that a smaller downward force needs to be employed by the user to initially break the soil surface. It will be noted that the blades 4 and 5 also function in the manner of cultivating tines during the operation of drawing the tines 3 and the blades 4 and 5 through the soil.

In the preferred form, the forward sides 13 and 14 of the blade members 4 and 5 generally opposite the handle 1 are sharpened. This allows the blade members to sever surface growth and sub-surface roots by a forward pushing motion applied by the gardener thereby eliminating the need for a hacking motion. The blade members preferably have the sharpened edges provided by bevels ground or otherwise formed on their inner faces. The cultivator tines 3 and sharpened forward sides 13 and 14 of the blade members 4 and 5 are preferably correspondingly convexly curved as best seen in FIG. 3 wherein the profile of the tines 3 is shown in chain-dot lines. The curvature reduces the stresses applied to the tines during cultivation and results in a shearing action being exerted by the blade members 4 and 5 during their severing of surface growth and underground roots. The outer ends 19 and 20 of the blade members 4 and 5 preferably extend at an angle of 45° to the axis of the handle 1. This is a convenient angle at which the garden cultivator tool may be held while cultivating the soil or slashing at weeds.

In the preferred form, only the outer side 13 or 14 of each blade member 4 and 5 is sharpened but, if desired, the outer end 19 and 20 of each blade member and/or the inner or rear side 21 or 22 of each member may be sharpened also, as shown.

As shown, preferably the rake tines 6 are convexly curved with respect to the side facing away from the handle. As with the cultivator tines 3, the curvature reduces the mechanical stresses to which the tines are subjected in use as compared with straight tines arranged at a right angle to the axis of the handle. Preferably the ends of the rake tines 6 are rather blunt while advantageously the ends of the cultivator tines 3 may be quite sharp.

At their root, each of the tines 3 and 6 and the blade members 4 and 5 are connected to a sturdy cross bar 24 connected at each end to an arcuate support piece 25 to which is connected a shaft 26 secured to the handle 1. The spacing between the bar 24 and the cross piece 26 is preferably sufficient so that if desired the gardener may put his or her foot on the bar 24 to press this more forcefully into the ground.

In use, with the tool in the position shown in FIGS. 1 and 3, it can be moved backwards and forwards through the soil in order to effect a cultivating action. On rotation of the tool through 90° about the axis of the handle, the forward edges 13 or 14 of the blade 4 or 5 may then be pushed forwardly against the stems of weeds or the like, usually slightly under the surface of the soil, somewhat in the manner of a conventional Dutch hoe. Rotating the tool through a further 90° about the handle axis allows the rake tines 6 to be employed to smooth or level the surface of the cultivated and hoed plot.

The tool as shown in the drawing is well adapted to be formed as a casting usually from a high strength metal or alloy, or from engineering grades of plastic. Alternatively the tool may be fabricated from sheet stock. In this case normally two pieces of sheet stock are used, one having the rake tines 6 and the other having the cultivator tines 3. The two pieces are welded or otherwise connected together along the line of the cross-bar 24, and the support pieces 25 and shaft 26 are then connected to the bar. Blade pieces 4 and 5 can then be connected to the cross bar 24. Alternatively, the stamping may include a tine at each end of the row which is bent rearwardly to a position corresponding to the rear edge of the blade 4 or 5 and then the blade is connected on the forward edge of the bent back tine.

I claim:

1. A gardening tool having an elongated handle; and a cultivator head attached at one end of the handle and having:
   (a) a row of relatively long cultivator tines each tapering from its point of connection to the cultivating head towards its tip and extending in a plane of extension and substantially parallel to the others and generally inclined to the axis of the handle;
   (b) a row of relatively short rake tines of even length each tapering from its points of connection to the cultivating head towards it tip and disposed parallel to the plane of extension of the cultivator tines, the tips of the rake tines extending in a direction substantially opposite to the tips of the cultivator tines; and
   (c) a generally planar blade member connected on an end of the row of cultivator tines and extending substantially parallel to the cultivator tines and a plane of extension of the rake tines and substantially parallel to the handle, the blade member increasing in width downwardly from its point of connection to the cultivator head to its free end, whereby the blade member adjacent its lower end exposes blade edges spaced away form the cultivator tines in the direction longitudinally parallel to the handle.

2. A tool as claimed in claim 1 wherein said blade member extends rearwardly from said row of cultivator tines generally toward said handle.

3. A tool as claimed in claim 1 wherein said cultivator tines are alternately long and then short, said tines being arranged symmetrically with respect to a median plane passing through the axis of the handle.

4. A tool as claimed in claim 1 further comprising a second blade member connected to an opposite end of said row of cultivator tines and disposed symmetrically thereto with respect to a median plane through the axis of the handle.

5. A tool as claimed in claim 1 wherein the forward side of the blade member generally opposite the handle is sharpened.

6. A tool as claimed in claim 5 wherein the sharpened edge is formed by a bevel on the inner face of the blade member.

7. A tool as claimed in claim 5 wherein the cultivator tines and the sharpened side of the blade member are convexly curved with respect to the side facing away from the handle.

8. A tool as claimed in claim 7 wherein the outer end of the blade member extends at an angle of 45° to the axis of the handle.

9. A tool as claimed in claim 8 wherein the side of the blade member generally facing toward the handle is concavely curved.

10. A tool as claimed in claim 9 wherein the outer end and the concavely curved side of the blade member are sharpened.

* * * * *